US006649068B2

(12) United States Patent
Phillips

(10) Patent No.: US 6,649,068 B2
(45) Date of Patent: Nov. 18, 2003

(54) FILTRATION OF PULP MILL LIQUIDS

(75) Inventor: Joseph R. Phillips, Queensbury, NY (US)

(73) Assignee: Andritz Inc., Glens Falls, NY (US)

( * ) Notice: Subject to any disclaimer, the term of this patent is extended or adjusted under 35 U.S.C. 154(b) by 127 days.

(21) Appl. No.: 09/843,822

(22) Filed: Apr. 30, 2001

(65) Prior Publication Data

US 2001/0054590 A1 Dec. 27, 2001

Related U.S. Application Data

(60) Provisional application No. 60/211,876, filed on Jun. 14, 2000.

(51) Int. Cl.[7] .............................................. B01D 37/02
(52) U.S. Cl. ....................... 210/739; 210/741; 210/745; 210/777; 210/778; 210/415; 162/55; 162/251
(58) Field of Search ................................ 210/777, 778, 210/193, 739, 741, 745, 415, 97, 103; 162/55, 251

(56) References Cited

U.S. PATENT DOCUMENTS

| 4,892,619 A | | 1/1990 | Tistad |
| 6,585,901 B2 | * | 7/2003 | Juutinen .................... 210/777 |
| 2003/0019595 A1 | | 1/2003 | Juutinen |

FOREIGN PATENT DOCUMENTS

| WO | WO 00/12811 | 3/2000 |
| WO | WO 01/48308 A1 | 7/2001 |

* cited by examiner

Primary Examiner—Robert J. Popovics
(74) Attorney, Agent, or Firm—Nixon & Vanderhye, P.P.C.

(57) ABSTRACT

A fiber mat is formed on a screen cylinder of a pressurized fiber filtering device used to filter particles from a liquid stream. The fiber mat is a fine particle filter to remove small particles from the liquid stream. The fiber mat is formed by injecting cellulosic fibers into the liquid stream flowing into the fiber filtering device. These fibers collect on the screen cylinder as the liquid flows through the cylinder. The collection of fibers forms the fine filtering mat.

22 Claims, 3 Drawing Sheets

FILTRATION OF PULP MILL LIQUIDS

RELATED APPLICATION

This application is related to and claims priority to U.S. provisional patent Application No. 60/211,876, filed Jun. 14, 2000, the entirety of which application is incorporated by reference.

BACKGROUND OF THE INVENTION

In the processing of cellulose material, for example, wood or recycled paper, liquid streams are produced that contain cellulose fibers or other impurities that are typically undesirable in the process in which the liquid is used. For example, cellulose fibers must be minimized or removed from spent cooking liquors before the liquors are forwarded to evaporators in a chemical recovery system. Otherwise, the cellulose fibers are minimized or removed from effluents of pulp washers or pulp presses used in processing of the virgin pulp or recycled pulp before the effluents can be used elsewhere.

Cellulose fibers and other undesirable material can be removed from liquid process streams by a filtering device. One type of filtering device that is typically used is a pressurized screening device. These filtering pressurized screening devices are similar to pulp-processing pressurized screening devices that isolate or "screen" large uncooked pieces of cellulose material, such as pins and shives, from cellulose pulp streams.

Unlike pulp-processing pressure screening devices, pressurized screening filtering devices (typically referred to as "fiber filters") filter undesirable material from liquid streams. Liquid streams typically have a much lower content of cellulose material than do the pulp streams fed to pulp screening devices. Pressurized pulp screening devices are typically fed cellulose pulp slurries having about 1 to 5% by weight (that is, about 1 to 5% consistency). In contrast, fiber filters are typically fed liquid streams having a fiber content of less than about 1% consistency, and preferably less than about 0.1% consistency, or even less than about 0.05%. For example, the liquid streams treated with fiber filters typically contain fiber in the range of 50 to 250 parts per million (ppm), which corresponds to a consistency of approximately about 0.005 to 0.025%.

Pressurized screen fiber filters typically contain perforated cylindrical screen baskets through which the fiber containing liquid stream is passed to remove the fibers and other materials. One typical fiber filter is the MODUScreen™ FF Pressure Filter provided by Andritz-Ahlstrom, Inc., of Glens Falls N.Y. This pressurized fiber filter screening device consists of a stationary cylindrical screen cylinder mounted about a cylindrical rotor. The stationary perforated cylinder contains circular throughholes, having an exemplary 0.2 mm diameter. However, the cylinder holes may be shaped as parallel bars or machined slots. In operation of the fiber filter, the liquid to be filtered flows from inside of a screen basket in the fiber filter, then radially outward through the screen where the undesirable material particles (for example, cellulose fibers), are prevented from passing through the screen perforations. These undesirable materials captured by the screen basket are passed out through a rejects outlet in the fiber filter and forwarded for further processing.

The cylindrical rotor of the fiber filter is provided with a series of uniformly spaced protrusions or "bumps". The leading edge of the bumps acts as a hydrofoil to impart a hydraulic pulse to the liquid flowing along the inside of the basket. The trailing edge of the bumps creates a fluid pressure drop which momentarily draws the liquid back through the holes to dislodge any material that may be stuck in the holes so as to minimize screen pluggage. This type of fiber filter has been effective in minimizing or removing cellulose fiber and other undesirable materials from liquid streams in and around pulp and paper mills.

Sometimes the liquid stream introduced to these filtering devices contains undesirable particles that cannot be easily isolated with conventional pressurized screen fiber filters. In particular, smaller particles are not easily isolated and tend to pass through the screen. Particles smaller in diameter than the diameter of the holes in the screen cylinder especially tend to pass through the screen holes. For example, particles smaller than the 0.2 mm diameter (about 0.008 inches) of the holes in the Andritz-Ahlstrom MODUScreen FF Filter are not easily isolated and tend to pass through the screen.

One method of capturing smaller particles is to reduce the size of the screen perforations to 0.15 or 0.1 mm (that is, 0.006 or 0.004 inches), for example. However, smaller diameter screen holes can be much more expensive and difficult to fabricate using existing drilling or cutting technology. Another alternative is to wrap the screen cylinder with a fine cloth, fabric, or wire screen having a tight weave to capture the smaller particles. Such fabrics or wire screen are prone to tearing and other damage from the loading and high speeds under which present fiber filters are operated. Neither of these alternatives are particularly feasible or economical under the present state of the technology.

SUMMARY OF INVENTION

According to the present invention, a fine screening medium is provided to the screen cylinder of a pressurized screen fiber filtering device. This fine screening medium is formed by adding at least some cellulose fibrous material to the filtering device so as to form a web or mat of cellulose material on the existing perforated surface. This web of cellulose fibers acts as a fine screening medium to filter small cellulose fibers and other undesirable material.

An embodiment of this invention is a process for removing solid particles from a liquid stream in a pulp or paper mill having a filtering device. The filtering device includes an inlet for liquid having at least some undesirable materials, an outlet for treated liquid having reduced concentration of undesirable material, an outlet for undesirable material, and a perforated screen element. A filter forming process is first used that comprises the steps of: (a) introducing a first liquid having an undesirable material content to the filter inlet; (b) introducing a second liquid having at least some comminuted fibrous material to the filter inlet to form a mixture of the first and second liquids; (c) passing the mixture of the first and second liquids through the screen element to produce a third liquid having little or no undesirable material; and (d) discharging the third liquid from the filtering device. As a result of this filter forming process, at least some of the comminuted cellulosic fibrous material introduced with the second liquid is retained on the screen element to form a permeable mat of cellulose material. The mat of cellulose material acts as a filtering medium for the undesirable material in the first liquid. The mat is retained on the screen element and is used to filter liquid streams flowing through the filter.

The filtering device is preferably a pressurized device having a cylindrical screen element. For example, the filtering device with cellulose mat may be a modified MODUScreen FF Pressure Filter provided by Andritz- Ahlstrom. Preferably, the second liquid containing at least some comminuted cellulosic fibrous material (for example, hardwood or softwood fibers), is mixed with the first liquid prior to being introduced to the filter inlet. The second stream containing the cellulose fibers may be introduced continuously to the first stream or may be introduced intermittently. For example, the cellulose steam may be automatically introduced in response to the state of the cellulose web or mat produced on the surface of the filter element, for example, as indicated by an electrical signal corresponding to the pressure drop across the filter element.

The invention may also include a system for treating a liquid stream in a pulp and paper mill to remove undesirable material from the liquid stream. The system comprises a filtering device having a perforated screen element having a filtering surface, an inlet, and a filtered liquid outlet; means for introducing a liquid containing undesirable material to the inlet; means for introducing a liquid containing at least some comminuted cellulosic fibrous material to the inlet; and means for forming a bed of comminuted cellulosic fibrous material on the filtering surface of the screen element to provide a finer screening medium than the screen element without the comminuted cellulosic fibrous material present. The screen element is preferably a cylindrical screen element. The cylindrical screen element may be stationary or it may rotate. The filtering surface of the cylindrical screen element may be an external surface or an internal surface, that is, the liquid may pass radially inward or radially outward through the cylindrical screen element.

DETAILED DESCRIPTION OF FIGURES

Figure 1:
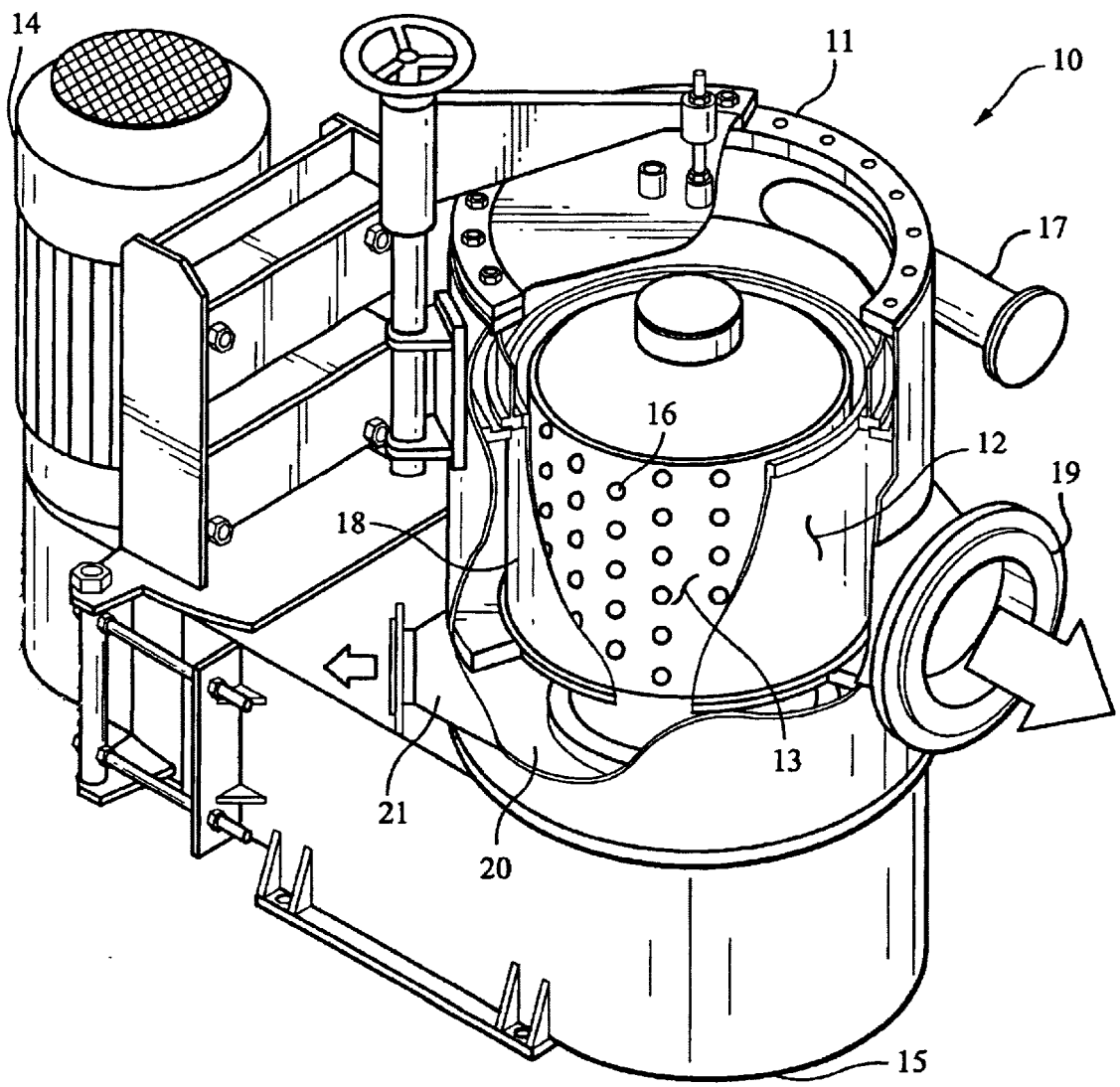
FIG. 1 is an isometric view, partially in cross section, of a conventional fiber filtering device with which the present invention can be used.

FIG. 1 illustrates a fiber filtering device 10 in which the present invention can be implemented. The device shown is a conventional MODUScreen™ FF Pressure Filter provided by Andritz-Ahlstrom Inc. of Glens Falls, N.Y. This device consists of a cylindrical housing 11 containing a stationary perforated cylindrical screen basket 12 and a cylindrical rotor 13. The rotor 13 is driven by an electric motor 14 through a conventional drive train (not shown). The housing 11, motor 14, and drive train are mounted in a base structure 15.

The screen cylinder 12 may be stationary or non-stationary and the rotor 13 may be stationary or non-stationary. The exemplary device 10 shown in FIG. 1 includes a stationary screen cylinder 12 and a rotating rotor 13. The rotor 13 includes a series of protrusions or "bumps" 16. The leading edge of these bumps acts as a hydrofoil to impart a hydraulic pulse to the liquid on the inside of the basket. The trailing edge of the bumps create a pressure drop which momentarily draws the liquid back through the holes to minimize screen pluggage. The bumps shown in FIG. 1 are hemispherical. However, the bumps may be implemented as a variety of shapes and contours, including rectangular, triangular, and elliptical shapes and contours.

The screen cylinder 12 is perforated with round holes. Although any type of perforations, e.g., non-circular, may be used, including short or elongated slots of rectangular or elliptical shapes. These holes in the screen cylinder are typically less than 1 mm in diameter, preferably less than 0.5 mm in diameter. For the MODUScreen FF of Andritz-Ahlstrom, the holes are typically about 0.2 mm in diameter. The perforated cylinder rotor basket 13 may be fabricated from machined plate, as is conventional, or from a parallel-bar type construction.

In the fiber filter 10 shown in FIG. 1, liquid containing undesirable cellulose fibers or other material is introduced tangentially to the top the housing 11 via an inlet conduit. This tangential inlet flow imparts a centrifugal force to the inlet liquid flow and, in particular, to any larger, denser, "tramp" materials (such as rocks, stones, nuts and bolts, etc.) in that flow. The centrifugal force causes the tramp material in the flow to collect in the periphery of the top of the housing 11 and, if desired, is discharged from tangential outlet 17. In the embodiment shown in FIG. 1 outlet 17 is closed by a blind flange.

From the inlet at the top of the filter, the liquid bearing the undesirable material passes downward through an annular slot between the stationary screen basket 12 and the rotor 13. The annular gap between the basket and rotor is between about 2 to 10 mm. With the aid of the pressure pulsations generated by the bumps 16 on rotor 13, the liquid passes through the holes of the screen basket 12, and collects in the annular chamber 18 between the screen 12 and the housing 11. By passing though the screen cylinder, the liquid is "accepted" by the filter. The liquid "accepts" is then discharged through a tangential outlet 19, and passes to further processing, for example, to an evaporator or washing apparatus.

The oversized or dense material that does not pass through the screen cylinder 12, continues to flow along the length of the annular gap between the screen and rotor and collects in the annular space 20 below the screen basket 12. This "reject" material is discharged from the space 20 via reject outlet 21, and is typically forwarded to recover useful fiber, for example, to a refiner or the reject material may be otherwise disposed.

Figure 3:
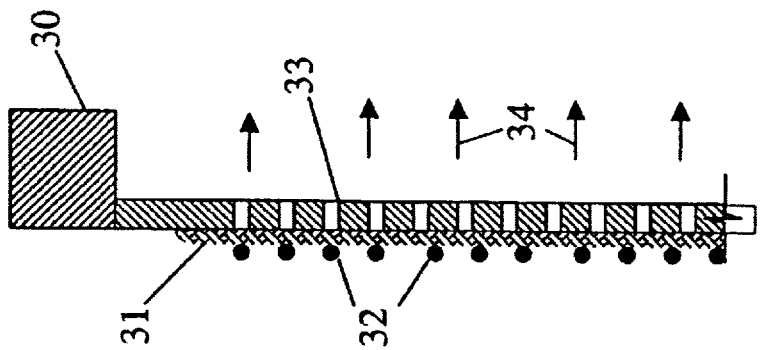
FIG. 3 is a schematic like FIG. 2 showing one embodiment of the present invention.

As described above, the prior art, as exemplified by the filtering device 10 shown in FIG. 1, is limited to removing undesirable material having a size greater than the perforations in the screen cylinder 12. Smaller particles of undesirable material could be removed by reducing the size of the perforations in the cylinder, which places an excessive burden upon the fabrication process, or placing a cloth-type barrier over the cylinder, which is prone to damage. Both of these alternatives are undesirable. The preferred alternative according to the present invention is illustrated in FIGS. 2 and 3.

Figure 2:
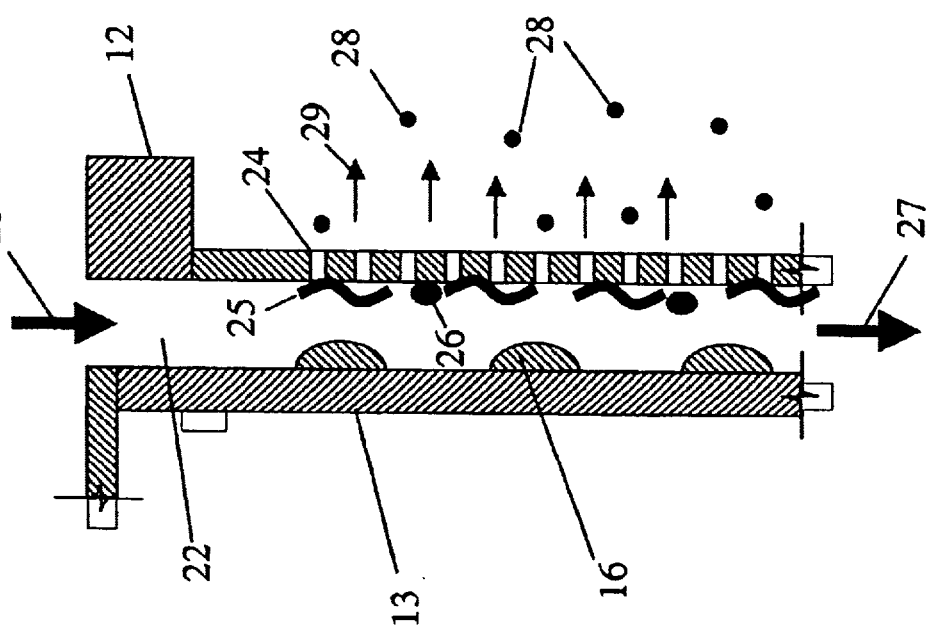
FIG. 2 is a schematic diagram of partial cross section of a fiber filtering device according to the prior art.

FIG. 2 illustrates a partial, cross-sectional view of the cylindrical screen 12 and the cylindrical rotor 13 having spherical bumps 16 shown in FIG. 1. In the conventional design of such fiber filter devices, the liquid bearing the undesirable fiber and other material passes into the annular gap 22 between the screen and rotor as shown by arrow 23. As the liquid passes through the annular gap 22, the liquid passes (flow arrows 29) radially outward through the holes (or perforations) 24 in cylinder 12. This liquid then passes to the accepts outlet 19 (shown in FIG. 1). Desirably, the fiber 25 and other undesirable materials 26 are prevented from passing through the screen holes and continue down the length of the annular gap 22 as shown by arrow 27 to be discharged from reject outlet 21 (shown in FIG. 1).

As shown in FIG. 2, particles 28 smaller than the holes 24 in the screen cylinder 12, can pass through the holes 24 and be included with the accept flow discharged from outlet 19 (see FIG. 1). These small particles 28 may be small cellulose fibers (referred to as "fines"); pigments, fillers, and other additives from recycled paper or paper machine white water; scale; products of corrosion; metal-containing compounds; or any other smaller particulate materials found in pulp and paper mill liquid streams. These small particles 28 can interfere with the operation of the devices to which the accept flow is passed, for example, these particles or their accumulation, can interfere with proper operation of evaporators, heat exchangers, pulp cooking equipment, and pulp washing equipment.

According to the present invention, the concentration of these small particles is minimized. FIG. 3 illustrates a partial cross-sectional view of a cylindrical screen 30, similar to the screen 12 shown in FIG. 2. The construction, operation, and hole size of the screen 30 is essentially identical to the screen 12 as shown in FIG. 2. However, a layer or mat of cellulose material 31 is introduced to an internal surface of the screen cylinder 30. This layer of material 31 acts as a further barrier to the passage of small particles 32 through the screen perforations 33 and into the accept flow shown by arrows 34. The small particles 32 are of the same diameter as the particles 28 that pass through the holes in the screen cylinder, but for the fiber mat 31. This layer of material 31 is comprised of overlapping cellulose fibers introduced to the inlet of the screen housing 11 of FIG. 1. Because of the mat of cellulose fibers on the screen cylinder, the content of fine particles 32 in the accept flow discharged from outlet 19 (in FIG. 1) is minimized. The absence of these small particles will prevent the small particles from interfering with the operation of the equipment to which the accept flow is sent, and will reduce the detrimental effect due to small particles on the operation of that equipment.

Figure 4:
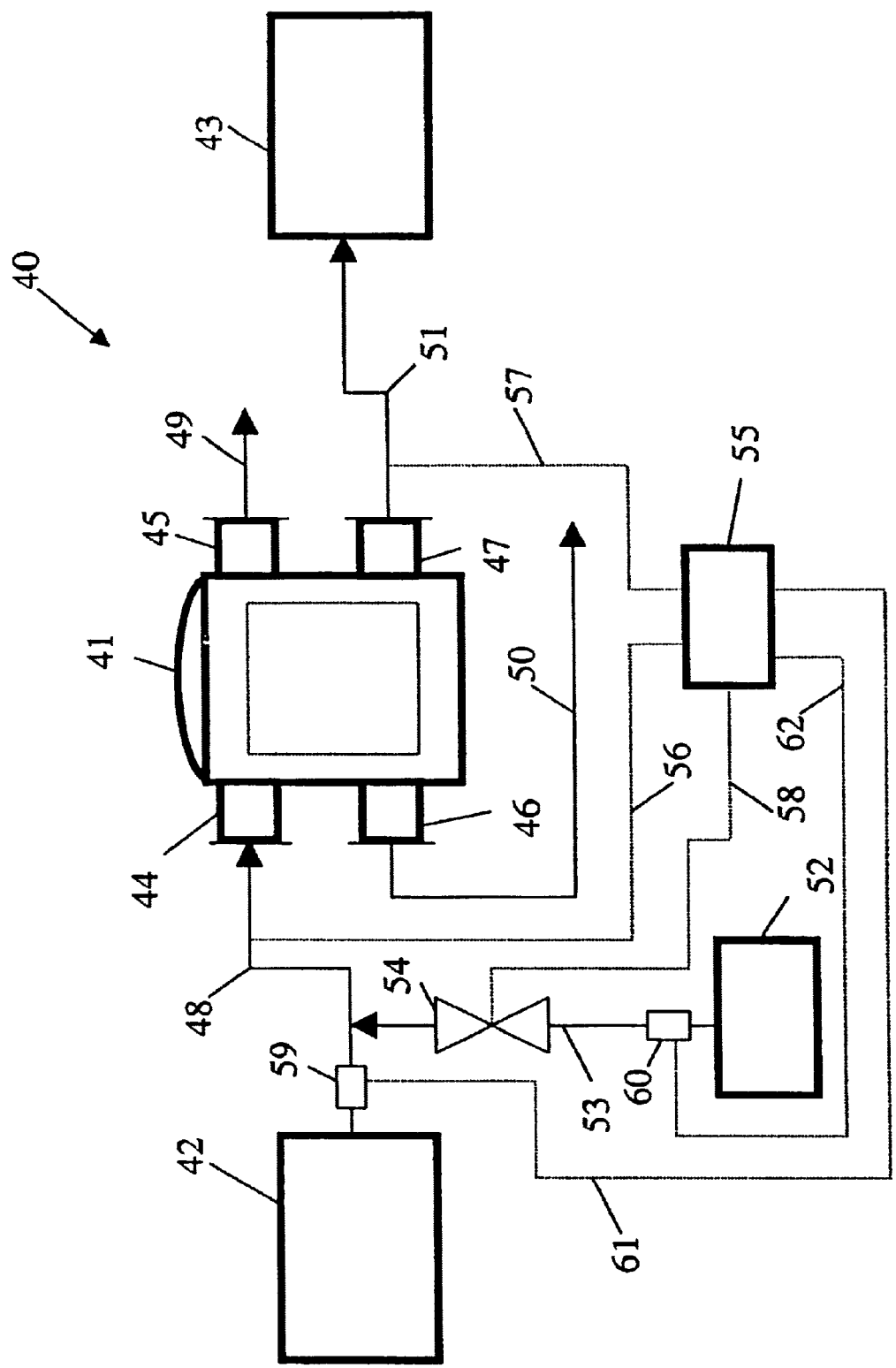
FIG. 4 is a schematic diagram of a system in which the present invention is practiced.

FIG. 4 illustrates one system 40 in which the present invention can be practiced. FIG. 4 includes a fiber filter 41, for example, an Andritz-Ahlstrom MODUScreen FF, which receives a liquid flow containing comminuted cellulosic fibrous material, for example, softwood fibers or other solid contaminants, from source 42 and forwards a filtered liquid having little or no comminuted cellulosic fibrous material to a process 43. The source of fiber containing liquid 42 may be a cellulose pulp digester, either continuous or batch, a pulp washer, pulp wash press, paper machine, or any other source of liquid that contains cellulose fibers or other solid contaminants that are preferably removed. The process 43 may be a recovery process, for example, an evaporator; a washing process, for example, a diffusion washer or drum washer; or any other pulp or paper mill process that can benefit from the removal of cellulose fibers and other undesirable material from the liquid stream which is fed to it.

The fiber filter 41 includes an unfiltered liquid inlet 44, a tramp material outlet 45, a rejects outlet 46, and an accepts outlet 47. The inlet 44 receives a stream of liquid from conduit 48. The tramp material outlet 45 discharges to conduit 49 and typically to disposal. The rejects outlet 46 discharges to conduit 50 and to further processing or disposal. The accepts outlet 47 discharges to conduit 51 which feeds the filtered liquid to the downstream process 43. Dilution liquid may also be introduced to device 41 as is conventional.

The system of FIG. 4 includes a source of comminuted cellulosic fibrous material 52, for example, hardwood or softwood fibers, which is fed to the inlet 44 of filter 41 via conduits 53 and 48. As described with respect to FIGS. 2 and 3, the fibers from source 52 are introduced to filter 41 to provide an additional filtering medium 31 (see FIG. 3) that minimizes or prevents the passage of fine particles through the filter 41, specifically screen 30 of FIG. 3. Source 52 may be any source of cellulose fibers, for example, a high-density pulp storage tank or a pulp washer or pulp press. The fibers from source 52 may be any form of fibers that will form a filtering medium, e.g., a mat, on the screen surface such as screen 30 of FIG. 3 within filter 41, including hardwood and softwood fibers; recycled fibers, including fibers from waste paper (MOW, ONP, etc.) and old corrugated container (OCC); fibers from agricultural waste, such as bagasse; and fibers from grasses, such as straw or hemp; or any other form of fibers. The fibers in conduit 53 may be supplied as a slurry at any available fiber to slurry weight concentration (e.g., consistency), for example, from 0.1% to 20% bone-dry(BD) consistency. The fibers are preferably supplied at a consistency less than about 12% BD, and even more preferably, less than about 5% BD.

The flow of fiber-containing slurry or liquid in conduit 53 may be regulated by a flow control valve 54. The flow control valve 54 may control the flow in conduit 53 in response to a control signal 58 received from a flow controller 55. This flow controller 55 may control the flow in conduit 53 based on a manual operator input or based on other control parameters in the pulp and paper mill. For example, the controller 55 may control flow in conduit 53 as a function of the pressure drop across the screen 30 (see FIG. 3). This pressure drop may be obtained from the pressure indicator signal 56 received from the pressure indicator in conduit 48 and the pressure indicator signal 57 received from the pressure indicator in conduit 51. The difference in these pressures indicates the pressure drop across the filter screen. In one mode of control, an increase in this pressure difference indicates that a sufficient layer of mat of fiber has been established on the screen, and that less or no further fiber need be introduced to the filter. A drop in the pressure difference across the screen indicates that more fiber should be added to re-establish the filtering fiber mat.

The flow through valve 54 may also be controlled as a function of the flow in conduit 48 as indicated by flow sensor 59 or the rate of flow through conduit 53 as indicated by flow sensor 60. These flow sensors 59, 60 are conventional flow detecting devices, such as magnetic-type flow meters, or "mag" meters. The control signal 61 from sensor 59 and the control signal 62 from sensor 60 provide a flow indication to controller 55. For example, the controller 55 may control the amount of flow passing through valve 54 as a function of the flow through flow meter 59. As the flow through meter 59 increases, the flow of fiber-containing liquid through valve 54 can be increased. Also, the sensor in conduit 51 having a control signal 57 may also be turbidity meter, that is, an optical sensor which indicates the clarity of the liquid passing through conduit 51. As the clarity of the liquid decreases, suggesting an increase in undesirable material in the liquid passing through conduit 51, the flow of fiber-containing liquid through valve 54 can be increased to increase the filtering effect and increase the clarity of the liquid in conduit 51. Other control mechanisms will be apparent to those familiar with the art.

In the above disclosure all specific ranges within a broad range are also included herein. For example, 1–20% includes ranges such as 1–3%, 2.4–8%, 1.3–6%, and all other narrower ranges within the broad range.

While the invention has been described in connection with what is presently considered to be the most practical and preferred embodiment, it is to be understood that the invention is not to be limited to the disclosed embodiment, but on the contrary, is intended to cover various modifications and equivalent arrangements and methods included within the spirit and scope of the appended claims, and as broadly as allowed by the prior art.

What is claimed is:

1. A process for removing solid particles from a liquid stream in a pulp or paper mill having a filtering device having an inlet for liquid having at least some particulate materials, an outlet for treated liquid having reduced concentration of the particulate material, an outlet for the particulate material, and a perforated screen element, comprising:

(a) introducing a first liquid having a first concentration of particulate materials to the inlet, wherein the particulate materials have an average size smaller than an aperture size of perforations in the screen element;

(b) introducing a second liquid having at least some comminuted fibrous material to the inlet to form a mixture of the first and second liquids, wherein said fibrous material has an average fiber length greater than the aperture size of the perforations in the screen element;

(c) passing the mixture of the first and second liquids through the screen element to produce a third liquid having a reduced amount of the particulate material;

(d) discharging the third liquid from the filtering device; and (e) practicing steps (a)–(d) so that at least some of the comminuted cellulosic fibrous material introduced with the second liquid is retained on the screen element to form a permeable mat of cellulose material which acts as a filtering medium for the undesirable material in the first liquid.

2. A process as recited in claim 1 wherein steps (a)–(d) are practiced using a cylindrical screen element as the screen element.

3. A process as recited in claim 1 wherein (b) is practiced so that the second liquid is mixed with the first liquid prior to being introduced to the inlet.

4. A process as recited in claim 1 wherein step (b) is practiced by continuously introducing the second liquid.

5. A process as recited in claim 1 wherein step (b) is practiced by intermittently introducing the second liquid.

6. A process as recited in claim 1 wherein in step (b) the introduction of the second liquid is regulated as a function of the introduction of the first liquid.

7. A process as recited in claim 1 wherein (a)–(d) are practiced so as to sense the particulate material in the liquid and to automatically adjust a mat formed on the screen element in response to that sensing.

8. A method for removing solid particles from a liquid stream in a pulp or paper mill having a filtering device having an inlet for liquid having a first concentration of the solid particles having an average particle size, a stream outlet for treated liquid having reduced concentration of the solid particles, a particle outlet for the particles removed from the stream, and a perforated screen element having perforations with an aperture size greater than the average particle size, said method, comprising:

(a) introducing a first liquid having the first concentration of solid particles to the inlet;

(b) introducing a second liquid having fibrous material to the inlet to form a mixture of the first and second liquids;

(c) passing the mixture of the first and second liquids through the screen element;

(d) forming a filter mat on the screen element from the fibrous material entrained on a surface of the screen element;

(e) passing the mixture through the filter mat and screen element and thereby filtering the solid particles from the mixture;

(f) discharging the third liquid through the stream outlet after the mixture passes through the filter mat and screen element, and (g) discharging the filtered solid particles through the particle outlet.

9. A method for removing solid particles from a liquid stream in a pulp or paper mill having a pressurized screening filtering device having an inlet for liquid having a first concentration of the solid particles, a stream outlet for treated liquid having reduced concentration of the solid particles, a particle outlet for the particles removed form the stream, and a perforated screen element having perforations with an aperture size larger than an average size of the solid particles, the method comprising:

(a) introducing a first liquid having the first concentration of solid particles to the inlet, wherein the first concentration is a concentration of solid particles of no greater than one percent of a total weight of the first liquid;

(b) introducing a second liquid having fibrous material to the inlet to form a mixture of the first and second liquids;

(c) passing the mixture of the first and second liquids through a screen element of the screening filtering device;

(d) forming a filter mat on the screen element from the fibrous material that is entrained on a surface of the screen element;

(e) passing the mixture through the filter mat and screen element and thereby filtering the solid particles from the mixture;

(f) discharging the third liquid through the stream outlet after the mixture passes through the filter mat and screen element, and (g) discharging the filtered solid particles through the particle outlet.

10. A method as in claim 9 wherein the first concentration is a concentration of solid particles of no greater than one tenth of a percent of a total weight of the first liquid.

11. A method as in claim 9 wherein the first concentration is a concentration of solid particles of no greater than five hundredths of a percent of a total weight of the first liquid.

12. A method as in claim 9 wherein the first concentration is a concentration of solid particles of no greater 250 solid particles per million parts of the first liquid.

13. A method as in claim 9 wherein the pressurized screening filtering device if a pressurized screen fiber filter comprising a perforated cylindrical screen basket, and wherein the passing of the mixture through the screen element in step (c) comprises passing the mixture through perforations in the perforated cylindrical screen basket.

14. A method as in claim 13 wherein perforated cylindrical screen basket has perforations for filtering the mixture and the perforations have an aperture dimension of at least 0.2 millimeter.

15. A method as in claim 14 wherein the solid particles of the first stream have an average size of no greater than 0.2 millimeter.

16. A method as in claim 15 wherein the fibrous material include fibers having a length greater than 0.2 millimeter.

17. A method for removing solid particles having an average dimension of 0.2 millimeter (mm) or less from a liquid stream in a pulp or paper mill having a pressurized screening filtering device having an inlet for liquid having a first concentration of the solid particles, a stream outlet for treated liquid having reduced concentration of the solid particles, a particle outlet for the particles removed from the stream, and a perforated screen element having filtering perforations with an aperture dimension of at least 0.2 mm, said method comprising:

(a) introducing a first liquid having the first concentration of solid particles to the inlet, wherein the average dimension of the solid particles is smaller than said aperture dimension;

(b) introducing a second liquid having fibrous material to the inlet to form a mixture of the first and second liquids, wherein said fibrous material has an average length greater than the aperture dimension of the screen element;

(c) passing the mixture of the first and second liquids through a screen element of the screening filtering device;

(d) forming a filter mat on the screen element from the fibrous material that is entrained on a surface of the screen element;

(e) filtering the solid particles from the mixture with the filter mat and screen element;

(f) forming a third mixture from the mixture passing through the filter mat and screen element;

(g) discharging the third liquid through the stream outlet after the mixture passes through the filter mat and screen element, and (h) discharging the filtered solid particles through the particle outlet.

18. A method as in claim 17 further comprising:

(i) adjusting the introduction of the second liquid in step (b) based on a pressure difference across the screen element.

19. A method for removing solid particles from a liquid stream in a pulp or paper mill having a filtering device having an inlet for a first liquid having a first concentration of the solid particles having an average particle size, a stream outlet for treated liquid having reduced concentration of the solid particles, a particle outlet for the particles removed form the stream, a perforated screen element having perforations with an aperture size greater than the average particle size, and a controller, comprising:

(a) introducing the first liquid with the first concentration of solid particles to the inlet of the filtering device;

(b) adding a second liquid to the first liquid at a rate determined by the controller to form a mixture of the first and second liquids, wherein the second liquid has a fibrous material content;

(c) passing the mixture of the first and second liquids through the screen element;

(d) forming a filter mat on the screen element from the fibrous material entrained on a surface of the screen element;

(e) passing the mixture through the filter mat and screen element and thereby filtering the solid particles from the mixture;

(f) adjusting the rate of adding the second liquid to the first liquid based on a condition of the mixture downstream of the screen element;

(g) discharging the third liquid through the stream outlet after the mixture passes through the filter mat and screen element, and (h) discharging the filtered solid particles through the particle outlet.

20. A method as in claim 19 wherein the condition of the mixture in step (f) is a pressure of the mixture, and step (f) further comprising adjusting the rate based on a determination of a pressure drop of the mixture across the screen element.

21. A method as in claim 20 wherein step (f) further comprises increasing the rate of the second liquid when a reduction of the pressure drop across the screen element is detected.

22. A method as in claim 19 wherein the condition is a clarity of the mixture downstream of the screen element, and step (f) further comprises increasing the rate of the second liquid when the clarity of the mixture downstream of the screen element increases.

* * * * *